United States Patent
Shin et al.

(10) Patent No.: US 11,414,541 B2
(45) Date of Patent: Aug. 16, 2022

(54) BLOCK COPOLYMER COMPOSITION

(71) Applicant: LG Chem, Ltd., Seoul (KR)

(72) Inventors: Eun Ji Shin, Daejeon (KR); Ki Soo Lee, Daejeon (KR); Seok Pil Sa, Daejeon (KR); Yoon Ki Hong, Daejeon (KR); Bun Yeoul Lee, Suwon-si (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 16/976,236

(22) PCT Filed: Mar. 29, 2019

(86) PCT No.: PCT/KR2019/003749
§ 371 (c)(1),
(2) Date: Aug. 27, 2020

(87) PCT Pub. No.: WO2019/190287
PCT Pub. Date: Oct. 3, 2019

(65) Prior Publication Data
US 2021/0017377 A1 Jan. 21, 2021

(30) Foreign Application Priority Data

Mar. 30, 2018 (KR) .................. 10-2018-0037549
Oct. 2, 2018 (KR) .................. 10-2018-0117841

(51) Int. Cl.
| | | |
|---|---|---|
| C08L 53/00 | (2006.01) | |
| C08F 293/00 | (2006.01) | |
| C08F 4/44 | (2006.01) | |
| C08F 10/14 | (2006.01) | |
| C08L 25/06 | (2006.01) | |
| C08L 25/08 | (2006.01) | |
| C08F 210/14 | (2006.01) | |
| C08F 212/08 | (2006.01) | |
| C07F 3/06 | (2006.01) | |
| C08F 297/02 | (2006.01) | |

(52) U.S. Cl.
CPC ............... *C08L 53/00* (2013.01); *C07F 3/06* (2013.01); *C08F 4/44* (2013.01); *C08F 10/14* (2013.01); *C08F 210/14* (2013.01); *C08F 212/08* (2013.01); *C08F 293/00* (2013.01); *C08F 297/02* (2013.01); *C08L 25/06* (2013.01); *C08L 25/08* (2013.01); *C08L 2201/08* (2013.01)

(58) Field of Classification Search
CPC .................. C08F 293/00; C08F 295/00; C08F 297/086
See application file for complete search history.

(56) References Cited

U.S. PATENT DOCUMENTS

| 3,649,579 A | 3/1972 | Ramsis et al. |
| 5,618,883 A | 4/1997 | Plamthottam et al. |
| 2005/0222356 A1 | 10/2005 | Joly et al. |

(Continued)

FOREIGN PATENT DOCUMENTS

| EP | 1470190 A2 | 10/2004 |
| EP | 2042531 A1 | 4/2009 |

(Continued)

OTHER PUBLICATIONS

Cao X et al: "Polyisobutylene Based Thermoplastic Elastomers: Vi. Pol Y(Alpha-Methylstyrene-Bisobutylene-B-Alpha-Methylstyrene) Triblock Copolymers By Coupling of Living Poly (Alphamethylstyrene-B-Isobutylene) Diblock Copolymers", Polymer Bulletin, Springer, Heidelberg, De, vol. 45, No. 2, Sep. 1, 2000 (Sep. 1, 2000), pp. 121-128, Xp000977 404.
European Search Report for Application No. 19776148.9, dated Nov. 20, 2020, 7 pages.

(Continued)

*Primary Examiner* — Jeffrey C Mullis
(74) *Attorney, Agent, or Firm* — Lerner, David, Littenberg, Krumholz & Mentlik, LLP

(57) ABSTRACT

A block copolymer composition is disclosed herein. In some embodiments, the block copolymer composition includes a diblock copolymer and a triblock copolymer each including a polyolefin-based block and a polystyrene-based block. The diblock copolymer is present at less than or equal to 19%, based on total weight of the block copolymer composition, the polyolefin-based block includes a repeating unit represented by Formula 1, and the polystyrene-based block includes one or more of Formulas 2 and 3:

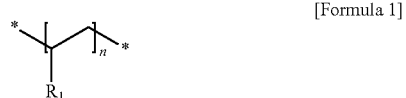

[Formula 1]

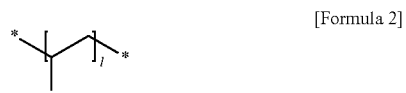

[Formula 2]

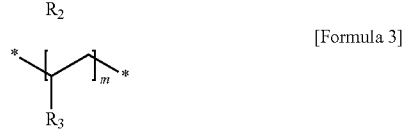

[Formula 3]

wherein $R_1$ is hydrogen, C3 to C20 alkyl, or C3 to C20 alkyl substituted with silyl, $R_2$ and $R_3$ are each independently C6 to C20 aryl, or C6 to C20 aryl substituted with halogen, C1 to C12 alkyl, or C3 to C12 cycloalkyl, n is an integer from 1 to 10,000, and l and m are each independently an integer from 10 to 1,000.

14 Claims, No Drawings

(56) References Cited

U.S. PATENT DOCUMENTS

| | | | |
|---|---|---|---|
| 2007/0078222 | A1 | 4/2007 | Chang et al. |
| 2008/0008739 | A1 | 1/2008 | Hossainy et al. |
| 2008/0153970 | A1 | 6/2008 | Salazar |
| 2012/0077400 | A1 | 3/2012 | Flood et al. |
| 2013/0101767 | A1 | 4/2013 | Wei |
| 2015/0030933 | A1 | 1/2015 | Goetzen et al. |
| 2016/0101209 | A1* | 4/2016 | Dubois .............. B32B 27/32 524/271 |
| 2018/0022852 | A1 | 1/2018 | Lee et al. |
| 2018/0030195 | A1* | 2/2018 | Oshita .............. B32B 7/12 |
| 2018/0187040 | A1 | 7/2018 | Wan et al. |
| 2020/0031978 | A1 | 1/2020 | Lee et al. |
| 2021/0002303 | A1* | 1/2021 | Sa .............. C08F 10/14 |
| 2021/0002473 | A1* | 1/2021 | Lee .............. C08F 4/44 |
| 2021/0017377 | A1 | 1/2021 | Shin et al. |
| 2021/0108066 | A1* | 4/2021 | Hong .............. C08F 4/44 |

FOREIGN PATENT DOCUMENTS

| | | |
|---|---|---|
| EP | 3257880 A1 | 12/2017 |
| EP | 3590983 A1 | 1/2020 |
| JP | 2005516099 A | 6/2005 |
| JP | 2020512470 A | 4/2020 |
| KR | 20160098968 A | 8/2016 |
| KR | 101732418 B1 | 5/2017 |
| KR | 101829382 B1 | 2/2018 |
| KR | 1848781 B1 * | 4/2018 |
| WO | 2016127353 A1 | 8/2016 |
| WO | 2018182174 A1 | 10/2018 |

OTHER PUBLICATIONS

European Search Report for Application No. 19778223.8, dated Nov. 20, 2020, 7 pages.
European Search Report for Application No. EP 19775609.1, dated Nov. 20, 2020, 7 pages.
European Search Report for Application No. EP 19776273.5, dated Nov. 20, 2020, 7 pages.
Chung et al., "A Novel Consecutive Chain Transfer Reaction to p-Methylstyrene and Hydrogen during Metallocene-Mediated Olefin Polymerization," Journal of the American Chemical Society, May 30, 2001, pp. 4871-4876, vol. 123, No. 21.
Dong et al., "Synthesis of Polyethylene Containing a Thermal p-Methylstyrene Group Metallocene-Mediated Ethylene Polymerization with a Consecutive Chain Transfer Reaction to p-Methylstyrene and Hydrogen," Macromolecules, Feb. 26, 2002, pp. 1622-1631, vol. 35, No. 5.
International Search Report for Application No. PCT/KR2019/003749 dated Jul. 10, 2019, 2 pages.
Kim et al., "Polystyrene Chain Growth from Di-End-Functional Polyolefins for Polystyrene-Polyolefin-Polystyrene Block Copolymers," Polymers, Oct. 2017, pp. 1-14, vol. 9, No. 481.
Kim et al., "Preparation of polystyrene-polyolefin multiblock copolymers by sequential coordination and anionic polymerization," RSC Advances, Jan. 9, 2017, pp. 5948-5956, vol. 7, No. 10.
Ning et al., "Synthesis of Amphiphilic Block-Graft Copolymers [Poly(styrene-b-ethylene-co-butylene-b-styrene)-g-Poly(acrylic acid)] and Their Aggregation in Water," Journal of Polymer Science Part A: Polymer Chemistry. May 1, 2002, pp. 1253-1266, vol. 40, No. 9.
Peinado, et al., "Effects of ozone in surface modification and thermal stabiity of SEBS block copolymers," Polymer Degradation and Stability, Jun. 1, 2010, pp. 975-986, vol. 95, No. 6.
Rabagliati, et al., "Styrene/(Styrene Derivative) and Styrene/(1-Alkene) Copolymerization Using Ph2Zn-Additive Initiator Systems," Macromol. Symp., Sep. 2004, pp. 55-64, vol. 216, No. 1.
Weiser et al., "Formation of Polyolefin-block-polystyrene Block Copolymers on Phenoxyimine Catalystsa," Molecular Rapid Communications, Jul. 5, 2006, pp. 1009-1014, vol. 27, No. 13.
International Search Report for Application No. PCT/KR2019/003750 dated Jul. 10, 2019, 2 pages.
International Search Report for Application No. PCT/KR2019/003751 dated Jul. 10, 2019, 2 pages.
International Search Report for Application No. PCT/KR2019/003754 dated Jul. 10, 2019, 2 pages.
Indian Examination Report for Application No. 202017042499 dated Jan. 19, 2022, 2 pages.

* cited by examiner

BLOCK COPOLYMER COMPOSITION

CROSS-REFERENCE TO RELATED APPLICATION

The present application is a national phase entry under 35 U.S.C. § 371 of International Application No. PCT/KR2019/003749, filed on Mar. 29, 2019, which claims priority from Korean Patent Application Nos. 10-2018-0037549 and 10-2018-0117841, filed Mar. 30, 2018 and Oct. 2, 2018, respectively, the disclosures of which are incorporated by reference herein.

TECHNICAL FIELD

The present invention relates a block copolymer composition, and more particularly, to a block copolymer composition including a diblock copolymer and a triblock copolymer which include an olefin-based polymer block and a styrene-based polymer block.

BACKGROUND ART

In recent years, polyolefin-polystyrene block copolymers, for example, styrene-ethylene/butylene-styrene (SEBS) or styrene-ethylene/propylene-styrene (SEPS), have formed a global market of several hundred thousand tons. Also, they have an advantage in that they have superior heat resistance and light fastness compared to styrene-butadiene-styrene (SBS) or styrene-isoprene-styrene (SIS), and have been used in materials for a grip or steering wheel that is tough but soft to the touch, elastic materials for diapers, oil gels used in medical and communication materials, impact modifiers for engineering plastics, flexibilizers or tougheners for transparent polypropylene, and the like. Conventional SEBS is prepared by a 2-step reaction of anionically polymerizing styrene and butadiene and subjecting the resulting SBS to a hydrogenation reaction. Likewise, conventional SEPS is also prepared by a 2-step reaction of anionically polymerizing styrene and isoprene and subjecting the resulting SIS to a hydrogenation reaction. As such, a process of saturating all the double bonds included in the polymer main chain by hydrogenating the same has a drawback in that the unit cost of SEBS and SEPS is considerably higher than SBS and SIS prior to the hydrogenation reaction due to high processing costs. This point acts as a limit on market expansion. Also, because it is in fact impossible to saturate all the double bonds in the polymer chain by means of the hydrogenation reaction, the commercialized SEBS and SEPS include a few residual double bonds, and the presence of the residual double bonds often become an issue (Journal of Polymer Science: Part A: Polymer Chemistry, 2002, 40, 1253; Polymer Degradation and Stability 2010, 95, 975). Also, the conventional block copolymer thus prepared through the two steps has a very limited structure because a polyolefin block is formed by means of a hydrogenation reaction after the anionic polymerization of butadiene or isoprene.

Under this background, the preparation of a polyolefin-polystyrene block copolymer directly from an olefin monomer and a styrene monomer using a one-pot reaction is a challenging subject of research having very high commercial ramifications. In this regard, it was reported in the prior art that, after polypropylene having a para-methylstyryl group at a terminal is synthesized using para-methylstyrene as a molecular weight control agent during polymerization of polypropylene, a polypropylene-polystyrene block copolymer is prepared by inducing a dehydrogenation reaction of a methyl group of the terminal with butyl lithium, followed by styrenically anionic polymerization (J. Am. Chem. Soc. 2001, 123, 4871; Macromolecules 2002, 35, 1622). As another example, an attempt utilizing the living polymerization reactivity of a phenoxyimine catalyst to perform an ethylene/propylene copolymerization, followed by injecting a styrene monomer to prepare a block copolymer (Marcomole. Rapid. Commun., 2006, 27, 1009) was reported. However, the methods reported in the prior art as described above are not applied to commercial processes because they require a multi-step process, and the like.

DISCLOSURE

Technical Problem

The present invention is designed to solve the problems of the prior art, and therefore it is an object of the present invention to provide a block copolymer composition including a diblock copolymer and a triblock copolymer which each include an olefin-based polymer block and a styrene-based polymer block.

Technical Solution

To achieve the above object, according to one aspect of the present invention, there is provided a block copolymer composition including a diblock copolymer and a triblock copolymer which each include an olefin-based block and a styrene-based block, wherein a content of the diblock copolymer is less than or equal to 19% by weight, based on the total weight of the block copolymer composition, the olefin-based block includes a repeating unit represented by the following Formula 1, and the styrene-based block includes one or more selected from the group consisting of the following Formulas 2 and 3:

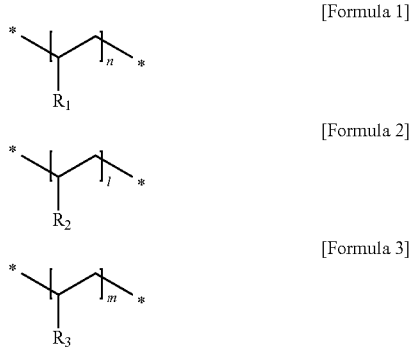

$R_1$ is hydrogen; an alkyl having 1 to 20 carbon atoms; an alkyl having 1 to 20 carbon atoms, which is substituted with silyl; an arylalkyl having 7 to 20 carbon atoms; or an arylalkyl having 7 to 20 carbon atoms, which is substituted with silyl, $R_2$ and $R_3$ are each independently an aryl having 6 to 20 carbon atoms; or an aryl having 6 to 20 carbon atoms, which is substituted with a halogen, an alkyl having 1 to 12 carbon atoms, a cycloalkyl having 3 to 12 carbon atoms, an alkoxy having 1 to 8 carbon atoms, or an aryl having 6 to 12 carbon atoms, n is an integer ranging from 1 to 10,000, and l and m are each independently an integer ranging from 10 to 1,000.

Advantageous Effects

A block copolymer composition according to the present invention includes a diblock copolymer and a triblock copolymer which each include an olefin-based polymer block and a styrene-based polymer block, and the structures and characteristics of each of the blocks included in such copolymers can be regulated so that the block copolymer composition can exhibit improved physical properties.

BEST MODE FOR CARRYING OUT THE INVENTION

Hereinafter, the present invention will be described in further detail to aid in understanding the present invention.

Therefore, it should be understood that the terms or words used in the specification and appended claims should not be construed as limited to general or dictionary meanings, but interpreted based on the meanings and concepts corresponding to technical aspects of the present invention on the basis of the principle that the inventor is allowed to define terms appropriately for the best explanation.

The term "composition" used in this specification is intended to encompass reaction products and decomposition products formed from materials of the corresponding composition as well as a mixture of the materials, including the corresponding composition.

The term "residual unsaturated bond" used in this specification refers to an unsaturated bond such as a double bond, a triple bond, or the like, which is present in the polymer chain of a block copolymer including a block copolymer composition. In this case, the polymer chain includes the main chain and side chains of the block copolymer, and includes unsaturated bonds generated in a polymerization process as well as unsaturated bonds included in source materials (such as monomers, polymers, initiators, catalysts, and the like) used to prepare the block copolymer or derived from the source materials.

Unless otherwise defined, the term "halogen" used in this specification refers to fluorine, chlorine, bromine, or iodine.

Unless otherwise defined, the term "alkyl" used in this specification refers to a linear, cyclic or branched hydrocarbon residue.

Unless otherwise defined, the term "aryl" used in this specification refers to an aromatic group including phenyl, naphthyl, anthryl, phenanthryl, chrysenyl, pyrenyl, and the like.

In this specification, the silyl may be silyl unsubstituted or substituted with an alkyl having 1 to 20 carbon atoms, for example, silyl, trimethylsilyl, or triethylsilyl.

The block copolymer composition of the present invention includes a diblock copolymer and a triblock copolymer which each include an olefin-based polymer block and a styrene-based polymer block, wherein a content of the diblock copolymer is less than or equal to 19% by weight, based on the total weight of the block copolymer composition, the olefin-based polymer block includes a repeating unit represented by the following Formula 1, and the styrene-based polymer block includes one or more selected from the group consisting of the following Formulas 2 and 3:

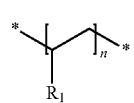

[Formula 1]

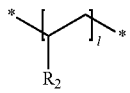

[Formula 2]

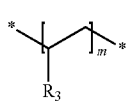

[Formula 3]

wherein $R_1$ is hydrogen; an alkyl having 1 to 20 carbon atoms; an alkyl having 1 to 20 carbon atoms, which is substituted with silyl; an arylalkyl having 7 to 20 carbon atoms; or an arylalkyl having 7 to 20 carbon atoms, which is substituted with silyl, $R_2$ and $R_3$ are each independently an aryl having 6 to 20 carbon atoms; or an aryl having 6 to 20 carbon atoms, which is substituted with a halogen, an alkyl having 1 to 12 carbon atoms, a cycloalkyl having 3 to 12 carbon atoms, an alkoxy having 1 to 8 carbon atoms, or an aryl having 6 to 12 carbon atoms, n is an integer ranging from 1 to 10,000, and l and m are each independently an integer ranging from 10 to 1,000.

In the formulas represented in the specification of the present invention, the symbol "*" represents a terminus of a repeating unit serving as a binding site.

According to one embodiment of the present invention, $R_1$ may be hydrogen; or an alkyl having 3 to 12 carbon atoms.

According to one embodiment of the present invention, $R_2$ and $R_3$ may be each independently phenyl; or phenyl unsubstituted or substituted with a halogen, an alkyl having 1 to 8 carbon atoms, a cycloalkyl having 3 to 12 carbon atoms, an alkoxy having 1 to 8 carbon atoms, or an aryl having 6 to 12 carbon atoms, and $R_2$ may be hydrogen; an alkyl having 3 to 20 carbon atoms; an alkyl having 3 to 20 carbon atoms, which is substituted with silyl; an arylalkyl having 8 to 20 carbon atoms; or an arylalkyl having 8 to 20 carbon atoms, which is substituted with silyl.

Also, $R_2$ may be hydrogen or an alkyl having 4 to 12 carbon atoms, and $R_2$ and $R_3$ may be phenyl.

n may be an integer ranging from 10 to 10,000, particularly an integer ranging from 500 to 7,000. Also, m may be an integer ranging from 10 to 1,000, particularly an integer ranging from 50 to 700. When both n and m satisfy these ranges, the block copolymer may exhibit both high tensile strength and a high modulus of elasticity.

l may be an integer ranging from 10 to 1,000, particularly an integer ranging from 50 to 700. In this case, when l falls within this range, the block copolymer may have a proper level of viscosity.

According to one embodiment of the present invention, when the olefin-based polymer block includes two or more repeating units represented by Formula 1, the olefin-based polymer block may include a repeating unit represented by the following Formula 4:

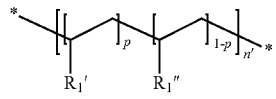

[Formula 4]

In Formula 4,
wherein $R_1'$ and $R_1''$ are each independently hydrogen; an alkyl having 1 to 20 carbon atoms; an alkyl having 1 to 20 carbon atoms, which is substituted with silyl; an arylalkyl having 7 to 20 carbon atoms; or an arylalkyl having 7 to 20 carbon atoms, which is substituted with silyl, provided that $R_1'$ and $R_1''$ are different from each other, $0<p<1$, and n' may be an integer ranging from 10 to 10,000.

Also, according to one embodiment of the present invention, $R_1'$ and $R_1''$ are each independently hydrogen or an alkyl having 3 to 20 carbon atoms, particularly, each independently hydrogen or an alkyl having 3 to 12 carbon atoms, and more particularly, each independently hydrogen or an alkyl having 4 to 12 carbon atoms.

In addition, particularly, n' may be an integer ranging from 10 to 10,000, and more particularly an integer ranging from 500 to 7,000.

According to one embodiment of the present invention, any one of $R_1'$ and $R_1''$ in Formula 4 may be hydrogen, and the other may be a substituent other than hydrogen among the aforementioned substituents.

That is, according to one embodiment of the present invention, when the olefin-based polymer block includes two or more repeating units represented by Formula 1, the olefin-based polymer block may include the repeating units in which a structure in which $R_1$ is hydrogen is randomly connected to a structure in which $R_1$ is not hydrogen but an alkyl having 1 to 20 carbon atoms; an alkyl having 1 to 20 carbon atoms, which is substituted with silyl; an arylalkyl having 7 to 20 carbon atoms; or an arylalkyl having 7 to 20 carbon atoms, which is substituted with silyl. Particularly, the olefin-based polymer block may include the repeating units in which a structure in which $R_1$ is hydrogen is randomly connected to a structure in which $R_1$ is not hydrogen but an alkyl having 3 to 20 carbon atoms.

Also, more particularly, the olefin-based polymer block may be configured so that a structure in which $R_1$ in Formula 1 is hydrogen is randomly connected to a structure in which $R_1$ is an alkyl having 3 to 12 carbon atoms. Further particularly, the olefin-based polymer block may be configured so that a structure in which $R_1$ in Formula 1 is hydrogen is randomly connected to a structure in which $R_1$ is an alkyl having 4 to 12 carbon atoms.

When the olefin-based polymer block includes two or more repeating units represented by Formula 1, the olefin-based polymer block may include a structure in which $R_1$ in Formula 1 is hydrogen and a structure in which $R_1$ is a substituent other than hydrogen at a weight ratio of 30:90 to 70:10, particularly a weight ratio of 40:60 to 60:40, and more particularly a weight ratio of 45:75 to 55:25.

When the olefin-based polymer block includes the structure in which $R_1$ in Formula 1 is hydrogen and the structure in which $R_1$ is a substituent other than hydrogen in the aforementioned weight ratio range, the prepared block copolymer includes a proper level of branches in the structure. Therefore, the block copolymer may have high values for modulus at 300% strain and elongation at break, thereby exhibiting excellent elastic characteristics. Also, the block copolymer may have a high molecular weight and wide molecular weight distribution as well, thereby exhibiting excellent processability.

According to one embodiment of the present invention, the diblock copolymer and the triblock copolymer may each independently include a composite block represented by the following Formula 5, which is formed by binding of the polyolefin-based block and the polystyrene-based block:

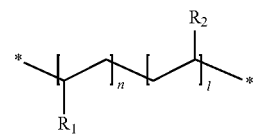

[Formula 5]

In Formula 5,
wherein $R_1$ is hydrogen; an alkyl having 1 to 20 carbon atoms; an alkyl having 1 to 20 carbon atoms, which is substituted with silyl; an arylalkyl having 7 to 20 carbon atoms; or an arylalkyl having 7 to 20 carbon atoms, which is substituted with silyl, $R_2$ is an aryl having 6 to 20 carbon atoms; or an aryl having 6 to 20 carbon atoms, which is substituted with a halogen, an alkyl having 1 to 12 carbon atoms, a cycloalkyl having 3 to 12 carbon atoms, an alkoxy having 1 to 8 carbon atoms, or an aryl having 6 to 12 carbon atoms, l is an integer ranging from 10 to 1,000, and n is an integer ranging from 10 to 10,000.

Also, in Formula 5, each of $R_1$, $R_2$, l, and n is as defined in Formula 1 or 2.

In addition, according to one embodiment of the present invention, when the olefin-based polymer block includes the repeating unit represented by Formula 4, the composite block formed by binding of the polystyrene-based block to the olefin-based polymer block may be represented by the following Formula 6:

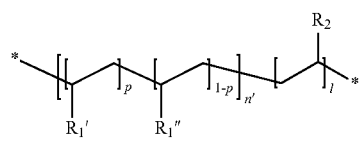

[Formula 6]

wherein each of $R_1'$, $R_1''$, p, l, and n' is as defined in Formula 2 or 4.

In this specification, the olefin-based polymer block including the repeating unit represented by Formula 1 is also referred to as a first block, and the styrene-based polymer blocks including the repeating units represented by Formulas 2 and 3 are also referred to as a second block and a third block, respectively.

According to one embodiment of the present invention, when two or more of the first and second blocks are included, the first block and the second block may be included such that the repeating unit is the composite block having the structure represented by Formula 5 or 6. For example, in description of an exemplary case in which the block copolymer composition according to one embodiment of the present invention includes a block copolymer including two first blocks, two second blocks, and one third block, it is meant that the block copolymer includes two composite blocks and one third block.

Also, according to one embodiment of the present invention, when the block copolymer includes two or more composite blocks of Formula 5 or 6, the composite blocks, except for one thereamong, may be connected to another composite block and not to the third block. For example, when the block copolymer includes two or more composite blocks, one of the composite blocks may be connected to the third block and to another composite block, and the block copolymer may be further extended via bonds between the composite blocks to have a structure such as "third block-composite block-composite block- . . . ".

Also, when the two composite blocks are connected, the first and second blocks included in the separate composite blocks may be connected. For example, when the block copolymer according to one embodiment of the present invention includes one third block and two composite blocks, the structure may have a structure such as "third block-first block-second block-first block-second block-".

As such, the block copolymer composition according to one embodiment of the present invention may include a block copolymer having a structure represented by the following Formula 7, which is particularly a triblock copolymer:

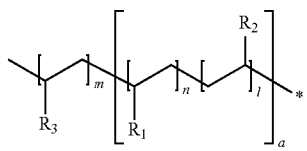

[Formula 7]

In Formula 7, wherein $R_1$ is hydrogen; an alkyl having 1 to 20 carbon atoms; an alkyl having 1 to 20 carbon atoms, which is substituted with silyl; an arylalkyl having 7 to 20 carbon atoms; or an arylalkyl having 7 to 20 carbon atoms, which is substituted with silyl, $R_2$ and $R_3$ are each independently an aryl having 6 to 20 carbon atoms; or an aryl having 6 to 20 carbon atoms, which is substituted with a halogen, an alkyl having 1 to 12 carbon atoms, a cycloalkyl having 3 to 12 carbon atoms, an alkoxy having 1 to 8 carbon atoms, or an aryl having 6 to 12 carbon atoms, l and m are each independently an integer ranging from 10 to 1,000, and n is an integer ranging from 10 to 10,000.

Also, in Formula 7, a may be an integer ranging from 1 to 50, particularly an integer ranging from 1 to 20, and more particularly an integer ranging from 1 to 10.

In addition, $R_1$ may be hydrogen; an alkyl having 1 to 13 carbon atoms; an alkyl having 1 to 13 carbon atoms, which is substituted with silyl; an arylalkyl having 7 to 13 carbon atoms; or an arylalkyl having 7 to 13 carbon atoms, which is substituted with silyl, $R_2$ may be phenyl unsubstituted or substituted with a halogen, an alkyl having 1 to 8 carbon atoms, a cycloalkyl having 3 to 12 carbon atoms, an alkoxy having 1 to 8 carbon atoms, or an aryl having 6 to 12 carbon atoms, $R_3$ may be hydrogen; or an alkyl having 1 to 12 carbon atoms.

Additionally, in Formula 7, each of $R_1$ to $R_3$, l, m, and n is as defined in Formulas 1 to 3.

Further, the block copolymer composition according to one embodiment of the present invention may include a block copolymer having a structure represented by the following Formula 8, which is particularly a triblock copolymer.

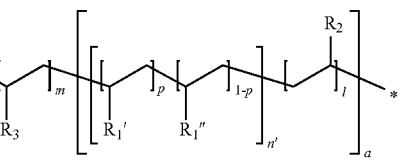

[Formula 8]

In Formula 8, wherein $R_1'$ and $R_1''$ are each independently hydrogen; an alkyl having 1 to 20 carbon atoms; an alkyl having 1 to 20 carbon atoms, which is substituted with silyl; an arylalkyl having 7 to 20 carbon atoms; or an arylalkyl having 7 to 20 carbon atoms, which is substituted with silyl, provided that $R_1'$ and $R_1''$ are different from each other, $0<p<1$, $R_2$ and $R_3$ are each independently an aryl having 6 to 20 carbon atoms; or an aryl having 6 to 20 carbon atoms, which is substituted with a halogen, an alkyl having 1 to 12 carbon atoms, a cycloalkyl having 3 to 12 carbon atoms, an alkoxy having 1 to 8 carbon atoms, or an aryl having 6 to 12 carbon atoms, l and m are each independently an integer ranging from 10 to 1,000, n is an integer ranging from 10 to 10,000, and a is an integer ranging from 1 to 50.

In Formula 8, each of $R_1'$, $R_1''$, p, l, n', and a is as defined in Formula 2, 4, or 7.

The block copolymer composition of the present invention may, for example, be prepared by a preparation method, which includes (1) allowing an organozinc compound to react with one or more olefin-based monomers in the presence of a transition metal catalyst to form an olefin-based polymer block, thereby preparing an intermediate; and (2) allowing the intermediate obtained in the step (1) to react with a styrene-based monomer in the presence of an alkyllithium compound to form a styrene-based polymer block.

The compound prepared in the step (2) may be an organozinc compound including a block copolymer having a structure of the repeating units of Formulas 1 to 3. Further, the product prepared in the step (2) may be converted into the block copolymer by allowing the product to react with water, oxygen, or an organic acid to convert the product into the block copolymer (step (3)).

Step (1) of allowing organozinc compound to react with one or more olefin-based monomers in presence of transition metal catalyst to form olefin-based polymer block, thereby preparing intermediate.

In the step (1), the olefin-based monomer may be inserted between A and Zn of the organozinc compound and polymerized to form an olefin-based polymer block including the repeating unit represented by Formula 1.

According to one embodiment of the present invention, the olefin-based monomer, which is inserted between A and Zn of the organozinc compound and polymerized to form the olefin-based polymer block (a first block), may include ethylene and one or more alpha-olefin-based monomers at the same time, and particularly may include ethylene and one or more alpha-olefin-based monomers which are not ethylene. According to one embodiment of the present invention, the olefin-based monomer, which is inserted between A and Zn of the organozinc compound and polymerized to form the olefin-based polymer block (a first block), may include ethylene and one or more alpha-olefin-based monomers at the same time, and particularly may include ethylene and one or more alpha-olefin-based monomers which are not ethylene.

According to one embodiment of the present invention, the alpha-olefin-based monomer may be particularly an aliphatic olefin having 3 to 20 carbon atoms, more particularly an aliphatic olefin having 4 to 12 carbon atoms, and further particularly an aliphatic olefin having 5 to 12 carbon atoms. The aliphatic olefin may, for example, include propylene, 1-butene, 1-pentene, 3-methyl-1-butene, 1-hexene, 4-methyl-1-pentene, 3-methyl-1-pentene, 1-heptene, 1-octene, 1-decene, 1-undecene, 1-dodecene, 1-tetradecene, 1-hexadecene, 1-eicosene, 4,4-dimethyl-1-pentene, 4,4-diethyl-1-hexene, 3,4-dimethyl-1-hexene, or the like. In this case, the alpha-olefin-based monomer may be any one, or a mixture of two or more, of the aforementioned components.

According to one embodiment of the present invention, the organozinc compound may be a compound represented by the following Formula 9:

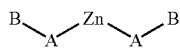

[Formula 9]

In Formula 1,
wherein A is an alkylene having 1 to 20 carbon atoms; an arylene having 6 to 20 carbon atoms; or an arylene having 6 to 20 carbon atoms, which is substituted with a halogen, an alkyl having 1 to 12 carbon atoms, a cycloalkyl having 3 to 12 carbon atoms, an alkoxy having 1 to 8 carbon atoms, or an aryl having 6 to 12 carbon atoms, and B is an arylene having 6 to 12 carbon atoms, which is substituted with an alkenyl having 2 to 12 carbon atoms.

Also, A may be an alkylene having 1 to 12 carbon atoms; an arylene having 6 to 12 carbon atoms; or an arylene having 6 to 12 carbon atoms, which is substituted with a halogen, an alkyl having 1 to 12 carbon atoms, a cycloalkyl having 3 to 12 carbon atoms, an alkoxy having 1 to 8 carbon atoms, or an aryl having 6 to 12 carbon atoms, and B may be an arylene having 6 to 12 carbon atoms, which is substituted with an alkenyl having 2 to 8 carbon atoms.

Formula 9 may have a structure in which a double bond is provided to both termini thereof. For example, when B is an arylene substituted with an alkenyl, the arylene may be connected to A, and the double bond of the alkenyl substituted in the arylene may be positioned in the outermost part in Formula 9.

When the organozinc compound is allowed to react with one or more olefin-based monomers to form the first block in the presence of the transition metal catalyst for olefin polymerization as described above, the olefin-based monomer may be polymerized while being inserted between the zinc (Zn) and organic group (A) of the organozinc compound to prepare an intermediate in which an olefin-based polymer block (a first block) is formed. One example of the intermediate thus formed is represented by the following Formula 10:

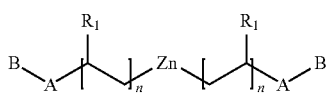

[Formula 10]

In Formula 10,
wherein $R_1$ is hydrogen; an alkyl having 1 to 20 carbon atoms; an alkyl having 1 to 20 carbon atoms, which is substituted with silyl; an arylalkyl having 7 to 20 carbon atoms; or an arylalkyl having 7 to 20 carbon atoms, which is substituted with silyl, A is an alkylene having 1 to 20 carbon atoms; an arylene having 6 to 20 carbon atoms; or an arylene having 6 to 20 carbon atoms, which is substituted with a halogen, an alkyl having 1 to 12 carbon atoms, a cycloalkyl having 3 to 12 carbon atoms, an alkoxy having 1 to 8 carbon atoms, or an aryl having 6 to 12 carbon atoms, B is an arylene having 6 to 12 carbon atoms, which is substituted with an alkenyl having 2 to 12 carbon atoms, and n is an integer ranging from 10 to 10,000.

Also, each of $R_1$ and n is as defined in Formula 1, and each of A and B is as defined in Formula 9.

According to one embodiment of the present invention, when the organozinc compound is allowed to react with two or more olefin-based monomers for forming the first block in the presence of the transition metal catalyst for olefin polymerization as described above, one example of the formed intermediate may be represented by the following Formula 11:

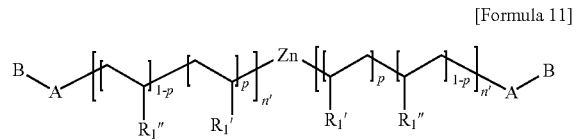

[Formula 11]

In Formula 11, wherein each of $R_1'$, $R_1''$, p, and n' is as defined in Formula 2, each of A and B is as defined in Formula 9.

Step (2) of allowing intermediate obtained in step (1) to react with styrene-based monomer in presence of alkyllithium compound to form styrene-based polymer block In the step (2), the styrene-based monomer may be inserted between Zn and the olefin-based polymer block of the intermediate and polymerized to form a styrene-based polymer block.

The alkyllithium may be an alkyllithium compound containing a silicon atom, and may, for example, be $Me_3SiCH_2Li$.

In the step (2), when the styrene-based monomer is inserted between Zn and the olefin-based polymer block of the intermediate and polymerized to form a styrene-based polymer block (a second block), the first block including the repeating unit represented by Formula 1 and the second block including the repeating unit represented by Formula 2 may be bound to form a composite block represented by Formula 5.

According to one embodiment of the present invention, in the step (2), the styrene-based monomer may be inserted between Zn and the olefin-based polymer block of the intermediate and polymerized to form a styrene-based polymer block (a second block). At the same time, the styrene-based monomer may be bound to a site represented by B of the organozinc compound represented by Formula 9 and polymerized to form a separate styrene-based polymer block. In this specification, the separate styrene-based polymer block bound to the site represented by B and polymerized is referred to as a third block, which corresponds to the repeating unit represented by Formula 3.

In the preparation method according to one embodiment of the present invention, because the first block, the second block, and the third block are formed symmetrically about zinc (Zn) as the center of the organozinc compound represented by Formula 9, a compound in which triblock copolymers including three blocks are formed symmetrically about the zinc may be prepared in the step (2). One example of such a block copolymer is represented by the following Formula 12:

[Formula 12]

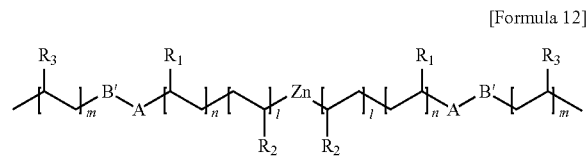

In Formula 12,
wherein each of $R_1$ to $R_3$, l, m, and n is as defined in Formulas 1 to 3, A is as defined in Formula 9, and B' represents a state in which B defined in Formula 9 is bound to the repeating unit of Formula 3.

Also, when the first block includes the repeating unit represented by Formula 4, one example of the compound prepared in the step (2) in which the triblock copolymers including three blocks are formed symmetrically about the zinc of the organozinc compound may be represented by the following Formula 13:

[Formula 13]

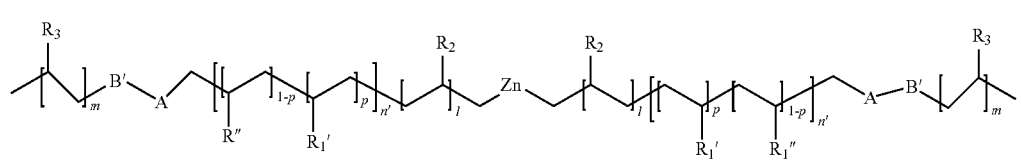

In Formula 13,
wherein each of $R_1'$, $R_1''$, $R_2$ and $R_3$, p, l, m, and n' is as defined in Formulas 2, 3 and 4, A is as defined in Formula 9, and B' represents a state in which B defined in Formula 9 is bound to the repeating unit of Formula 3.

According to one embodiment of the present invention, the styrene-based monomer may be for example, a styrene-based monomer that is unsubstituted or substituted with a halogen, an alkyl having 1 to 8 carbon atoms, a cycloalkyl having 3 to 12 carbon atoms, an alkoxy having 1 to 8 carbon atoms, or an aryl having 6 to 12 carbon atoms.

As described above, as the second block and the third block are simultaneously formed in the step (2), a triblock copolymer may be formed. In the step (2), when one of the second block and the third block is not formed, a diblock copolymer is formed.

The block copolymer composition of the present invention includes a polystyrene-polyolefin-polystyrene triblock copolymer and a polyolefin-polystyrene diblock copolymer, and a content of the diblock copolymer is less than or equal to 19% by weight. The contents of the polyolefin-polystyrene diblock copolymer and the polystyrene-polyolefin-polystyrene triblock copolymer is affected by the ratio of the number of moles of the organozinc compound used in the step (1) and the number of moles of the alkyllithium compound used in the step (2).

When the number of moles of the alkyllithium compound used in the step (2) to prepare the block copolymer composition of the present invention is higher than the number of moles of the organozinc compound used in the step (1), that is, when an amount of lithium (Li) is used at an amount higher than that of zinc (Zn) during preparation of the block copolymer composition according to the present invention, productivity may be improved due to an increased polymerization rate, and both the zinc (Zn) and olefinic polymer ends are initiated to effectively synthesize a triblock copolymer, resulting in an increased content of the triblock copolymer in the composition.

Meanwhile, the number of moles of the alkyllithium compound used in the step (2) is not particularly limited as long as the number of moles of the alkyllithium compound is higher than the number of moles of the organozinc compound used in the step (1). However, a ratio of the number of moles of the organozinc compound used in the step (1) and the number of moles of the alkyllithium compound used in the step (2) may be in a range of 1:1.05 to 1:4, particularly 1:1 to 1:3, and more particularly 1.1 to 2.5.

The block copolymer composition of the present invention may include the diblock copolymer at an amount of 19% by weight or less, particularly 18% by weight or less, and more particularly 17% by weight or less, based on the total weight of the block copolymer composition. Because the mechanical properties of the copolymer composition may be degraded with an increasing content of the diblock copolymer, the smaller the content of diblock copolymer the better. However, the lower limit of the content of the diblock copolymer content may be 0.1% by weight. According to one embodiment of the present invention, the diblock copolymer may have the structure represented by Formula 5 or 6, and the triblock copolymer may have the structure represented by Formula 7 or 8. Also, the diblock copolymer may have a structure in which the units derived from the organozinc compound of Formula 9, that is, B and A defined in Formula 9 are bound to one end of Formula 5 or 6 and the other end of Formula 5 or 6 is terminated with $CH_3$, and the triblock copolymer may have the structure represented by Formula 7 or 8.

According to one embodiment of the present invention, an amine-based compound, particularly a triamine compound may be used together with the alkyllithium compound in the step (2). The triamine compound may, for example, be N,N,N'',N'',N''-pentamethyldiethylenetriamine (PMDETA). The alkyllithium compound and the amine-based compound may, for example, be used at a molar ratio of 0.5:1 to 1:1. The amine-based compound may serve as an initiator in combination with the alkyllithium compound.

The block copolymer composition of the present invention may include the polyolefin-based block at an amount of 10% by weight to 99% by weight, and the polystyrene-based block at an amount of 1% by weight to 90% by weight, based on the total weight of the composition. Particularly, the block copolymer composition may include the polyolefin-based block at an amount of 40% by weight to 85% by weight, and the polystyrene-based block at an amount of 15% by weight to 60% by weight in total amount of the polystyrene-based block. More particularly, the block copolymer composition may include the polyolefin-based block at an amount of 60% by weight to 80% by weight, and the polystyrene-based block at an amount of 20% by weight to 40% by weight in total amount of the polystyrene-based block.

The block copolymer composition according to one embodiment of the present invention may have a structure in which a unit derived from the compound used during the preparation process, particularly a unit derived from the organozinc compound of Formula 9, is included between the third block and the first block. One example of such a block copolymer structure is represented by the following Formula 14:

[Formula 14]

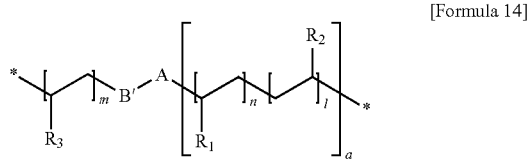

In Formula 14, wherein each of $R_1$ to $R_3$, l, m, n, and a is as defined in Formulas 1 to 3 and 7, A is as defined in Formula 9, and B' represents a state in which B defined in Formula 9 is bound to the repeating unit of Formula 3.

Also, another example of the block copolymer structure in which a unit derived from the compound used during the preparation process, particularly a unit derived from the organozinc compound of Formula 9, is included between the third block and the first block may be represented by the following Formula 15:

[Formula 15]

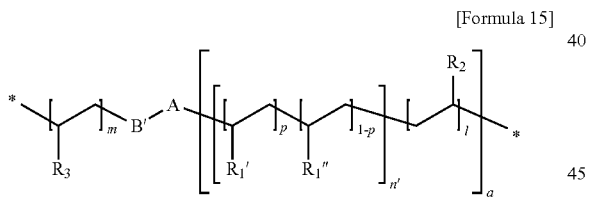

In Formula 15,
wherein each of $R_1'$, $R_1''$, $R_2$ and $R_3$, p, l, m, n', and a is as defined in Formulas 2 to 4 and 7, A is as defined in Formula 9, and B' represents a state in which B defined in Formula 9 is bound to the repeating unit of Formula 3.

The block copolymer composition according to one embodiment of the present invention may be prepared using a preparation method, which includes preparing a compound, which is formed symmetrically about zinc as a center, using the organozinc compound, followed by adding water, oxygen, or an organic acid thereto, but does not require a separate saturation process for hydrogenating the block copolymer. Therefore, the block copolymer composition has an advantage in that the composition is prepared by means of a one-pot preparation method excluding a separate saturation process for hydrogenating the block copolymer.

Also, because a monomer that may leave a residual unsaturated bond, such as a diene compound (for example, butadiene or isoprene), is not used during the preparation of the polyolefin-based block included in the block copolymer composition of the present invention, the block copolymer composition of the present invention does not have a problem that the unsaturated bonds which are not saturated even by a saturation process of hydrogenating the monomer remain.

The block copolymer composition of the present invention thus prepared may have a weight average molecular weight of 58,000 g/mol to 500,000 g/mol, particularly a weight average molecular weight of 60,000 g/mol to 300,000 g/mol, and more particularly a weight average molecular weight of 65,000 g/mol to 200,000 g/mol.

The block copolymer composition may have a polydispersity index (PDI) value of greater than 1.1 and 3 or less, particularly 1.2 to 2.5, and more particularly 1.3 to 1.8.

The block copolymer composition may have a tensile strength of 30 MPa or more, particularly 5 MPa to 28 MPa, and more particularly 10 MPa to 26 MPa, as measured according to the ISO37 standards.

Also, the block copolymer composition may have a modulus at 300% strain of 2 MPa to 15 MPa, particularly 2.5 MPa to 10 MPa, and more particularly 3 MPa to 8 MPa.

Further, the block copolymer composition may have an elongation at break of 800% to 2,000%, particularly 850% to 1,500%, and more particularly 870% to 1,300%.

MODE FOR CARRYING OUT THE INVENTION

Examples

Hereinafter, Examples of the present invention will be described in further detail so that a person having ordinary skill in the art to which the present invention belongs can easily put the invention into practice. However, it should be understood that the present invention may be embodied in various forms and is not limited to the Examples described herein.

Preparation Example: Preparation of Organozinc Compound

[Formula 16]

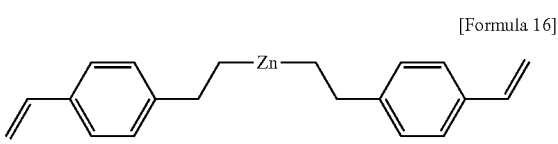

Borane dimethyl sulfide (1.6 mL, 3.2 mmol) was slowly added to triethylborane (0.6 g) while stirring, and then reacted for 90 minutes. The resulting reaction mixture was slowly added to divinylbenzene (3.8 g) dissolved in anhydrous diethylether (10 mL) cooled to −20° C., and stirred overnight. After the solvent was removed using a vacuum pump, diethyl zinc (0.8 g) was added thereto. A reaction was carried out at 0° C. for 5 hours while removing the generated triethylborane through vacuum distillation. Residual divinylbenzene and diethyl zinc were removed by vacuum distillation at 40° C. Methylcyclohexane (150 mL) was added to dissolve the product, and solid compounds generated as by-products were filtered off through Celite to prepare an organozinc compound represented by Formula 16.

Example 1

15 mL of 1-hexene and 240 μmol of an organozinc compound {$(CH_2=CHC_6H_4CH_2CH_2)_2Zn$} were dissolved in 100 g of methylcyclohexane, and the resulting mixture was put into a high-pressure reactor, and heated to a temperature of 80° C.

A solution (5 µmol) including a transition metal compound represented by the following Formula 17 and [(C$_{18}$H$_{37}$)N(Me)H$^+$[B(C$_6$F$_5$)$_4$]$^-$ as a cocatalyst at a ratio of 1:1 was injected into the high-pressure reactor, and ethylene was immediately injected thereinto so that the pressure was maintained at 20 bars.

After a polymerization process was performed at a temperature of 95° C. to 100° C. for 45 minutes, the remaining gas was exhausted. Me$_3$SiCH$_2$Li and N,N,N",N",N"-pentamethyldiethylenetriamine (PMDETA) were mixed at a ratio of 1:1 (420 µmol) in methylcyclohexane, and the resulting mixture was injected into the reactor, and then stirred for 30 minutes. The stirring temperature was maintained at 90° C. to 100° C. 8.5 mL of styrene was injected into the high-pressure reactor, and the mixture was reacted for 5 hours, while maintaining the temperature between 90° C. and 100° C., so as to convert all the styrene monomers. When the styrene was completely converted, acetic acid and ethanol were sequentially injected. The obtained polymer composition was dried overnight at 80° C. in a vacuum oven.

[Formula 17]

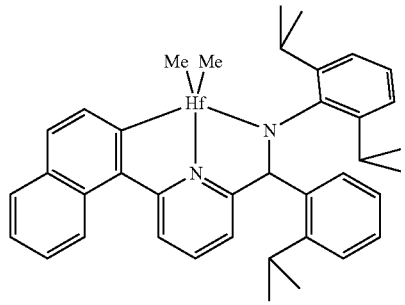

Examples 2 to 9

Polymer compositions were prepared in the same manner as in Example 1, except that the amounts of 1-hexene, styrene, an organozinc compound, methylcyclohexane, a transition metal compound/cocatalyst solution, and Me$_3$SiCH$_2$Li, and PMDETA used were varied as listed in Table 1 below.

Comparative Examples 1 to 3

In Comparative Examples 1 to 3, Product #200565 and 200557 (Aldrich) and G1657 (Kraton) were used as commercially available SEBSs, respectively.

Comparative Example 4

30 mL of 1-propylene and 150 µmol of an organozinc compound {(CH$_2$=CHC$_6$H$_4$CH$_2$CH$_2$)$_2$Zn} were dissolved in 100 g of methylcyclohexane, and the resulting mixture was put into a high-pressure reactor, and then heated to a temperature of 80° C.

A solution (4 µmol) including a transition metal compound represented by Formula 17 and [(C$_{18}$H$_{37}$)N(Me)H$^+$ [B(C$_6$F$_5$)$_4$]$^-$ as a cocatalyst at a ratio of 1:1 was injected into the high-pressure reactor, and 30 g of propylene was immediately injected thereinto. Thereafter, ethylene was added to adjust the pressure to 20 bars, and the pressure was then maintained at 20 bars.

After a polymerization process was performed at a temperature of 95° C. to 110° C. for 45 minutes, the remaining gas was exhausted. Me$_3$SiCH$_2$Li and N,N,N",N",N"-pentamethyldiethylenetriamine (PMDETA) were mixed at a ratio of 1:1 (150 µmol) in methylcyclohexane, and the resulting mixture was injected into the reactor, and then stirred for 30 minutes. The stirring temperature was maintained at 90° C. to 100° C. 7.8 g of styrene was injected into the high-pressure reactor, and the mixture was reacted for 5 hours, while maintaining the temperature between 90° C. and 100° C., so as to convert all the styrene monomers. When the styrene was completely converted, acetic acid and ethanol were sequentially injected. The obtained polymer composition was dried overnight at 80° C. in a vacuum oven.

Comparative Example 5

A polymer composition was prepared in the same manner as in Comparative Example 4, except that 35 mL of propylene was injected, and ethylene was then injected to adjust the pressure to 20 bars, and the pressure was maintained at 20 bars.

Comparative Example 6

10 mL of 1-hexene and 150 µmol of an organozinc compound {(CH$_2$=CHC$_6$H$_4$CH$_2$CH$_2$)$_2$Zn} were dissolved in 100 g of methylcyclohexane, and the resulting mixture was put into a high-pressure reactor, and heated to a temperature of 80° C.

A solution (4 µmol) including a transition metal compound represented by Formula 17 and [(C$_{18}$H$_{37}$)N(Me)H$^+$ [B(C$_6$F$_5$)$_4$]$^-$ as a cocatalyst at a ratio of 1:1 was injected into the high-pressure reactor, and 30 g of propylene was immediately injected thereinto. Thereafter, ethylene was added to adjust the pressure to 20 bars, and the pressure was then maintained at 20 bars.

After a polymerization process was performed at a temperature of 95° C. to 110° C. for 45 minutes, the remaining gas was exhausted. Me$_3$SiCH$_2$Li and N,N,N",N",N"-pentamethyldiethylenetriamine (PMDETA) were mixed at a ratio of 1:1 (150 µmol) in methylcyclohexane, and the resulting mixture was injected into the reactor, and then stirred for 30 minutes. The stirring temperature was maintained at 90° C. to 100° C. 7.8 g of styrene was injected into the high-pressure reactor, and the mixture was reacted for 5 hours, while maintaining the temperature between 90° C. and 100° C., so as to convert all the styrene monomers. When the styrene was completely converted, acetic acid and ethanol were sequentially injected. The obtained polymer composition was dried overnight at 80° C. in a vacuum oven.

Comparative Example 7

A polymer composition was prepared in the same manner as in Comparative Example 6, except that 15 mL of 1-hexene was injected, and ethylene was then injected to adjust the pressure to 20 bars, and the pressure was maintained at 20 bars.

TABLE 1

| | | | Amounts used | | | |
|---|---|---|---|---|---|---|
| | α-olefin (mL) | Styrene (mL) | Organozinc compound (μmol) | Methylcyclohexane (g) | Transition metal compound/ cocatalyst solution (μmol) | Me$_3$SiCH$_2$Li/ PMDETA |
| Example 1 | hexene 15 | 8.5 | 240 | 100 | 5 | 420 |
| Example 2 | hexene 15 | 8.5 | 300 | 100 | 5 | 420 |
| Example 3 | hexene 15 | 8.5 | 179 | 100 | 5 | 420 |
| Example 4 | hexene 30 | 6.5 | 357 | 100 | 5 | 420 |
| Example 5 | hexene 25 | 6.5 | 357 | 100 | 5 | 420 |
| Example 6 | hexene 30 | 8.5 | 357 | 100 | 5 | 420 |
| Example 7 | hexene 30 | 10 | 357 | 100 | 5 | 420 |
| Example 8 | hexene 50 | 13 | 714 | 200 | 5 | 815 |
| Example 9 | hexene 60 | 13 | 714 | 200 | 5 | 815 |
| Comparative Example 4 | propylene 30 | 7.8 | 150 | 100 | 4 | 150 |
| Comparative Example 5 | propylene 35 | 7.8 | 150 | 100 | 4 | 150 |
| Comparative Example 6 | hexene 10 | 7.8 | 150 | 100 | 4 | 150 |
| Comparative Example 7 | hexene 15 | 7.8 | 150 | 100 | 4 | 150 |

Experimental Example

Physical properties of the block copolymers prepared in Examples 1 to 9 and Comparative Examples 1 to 7 were measured according to the following methods. The results are listed in Table 2 below.

1) Weight Average Molecular Weight (Mw, g/mol), Number Average Molecular Weight (Mn, g/mol), and Polydispersity Index (PDI)

A weight average molecular weight (Mw, g/mol) and a number average molecular weight (Mn, g/mol) of each of the block copolymers were measured using gel permeation chromatography (GPC), and a polydispersity index (PDI) was calculated by dividing the weight average molecular weight by the number average molecular weight.

Column: PL Olexis
Solvent: trichlorobenzene (TCB)
Flow rate: 1.0 mL/min
Sample concentration: 1.0 mg/mL
Amount of injection: 200 μL
Column temperature: 160° C.
Detector: Agilent High Temperature RI detector
Polystyrene standard used
Molecular weight calculated via Universal Calibration using the Mark-Houwink equation (K=40.8×10$^{-5}$, α=0.7057)

2) Contents of 1-Hexene and Branch

The contents of 1-hexene and a branch were measured using NMR. That is, the contents of 1-hexene and a branch were measured under $^1$H NMR conditions (ns=16, d1=3 s, solvent=TCE-d2, 373 K) using Bruker 600 MHz AVANCE III HD NMR equipment, and TCE-d2 solvent peaks were calibrated to 6.0 ppm. Thereafter, the peaks (triplet) for CH$_3$ of the 1-butene at 0.92 ppm and CH$_3$ of the butyl branch of 1-hexene in the vicinity of 0.96 ppm were confirmed, and the contents were calculated.

3) Measurement of Tensile Strength, Modulus at 300% Strain, and Elongation

Each of the polymer compositions prepared in Examples 1 to 5 and Comparative Examples 1 to 3 was molded into dumbbell-shaped specimens according to ASTM D-412. The specimens were pulled at a crosshead speed of 500 mm/min using a universal testing machine (UTM) device (Model: 4466, Instron) according to ASTM D638, and a point at which each of the specimens was cut was measured. The tensile strength was calculated according to the following Equation 1. Also, the elongation (%) was calculated according to the following Equation 2, and the modulus at 300% strain (stress at 300% strain) (MPa) was measured as the tensile strength when a specimen was elongated to 3 times its initial length.

$$\text{Tensile strength (kgf/mm}^2) = \frac{\text{Load value (kgf)}}{\text{Thickness (mm)} \times \text{Width (mm)}} \quad \text{[Equation 1]}$$

$$\text{Elongation (\%)} = \frac{\text{Length after Elongation}}{\text{Initial length}} \times 100 \quad \text{[Equation 2]}$$

4) Content of Diblock Copolymer

A GPC curve obtained using gel permeation chromatography (GPC) was obtained by deconvoluting peaks by assuming two Gaussian curves.

Origin was used as a program for peak deconvolution, and Multiple Peak Fit was used for analysis. Specifically, the peaks on the Gaussian curve were fitted into two peaks on the assumption that the measured molecular weight is the molecular weight of the triblock copolymer and 75% of the measured molecular weight is the molecular weight of the diblock copolymer. The obtained area percentage was calculated as the weight percentage, based on the measured molecular weight.

TABLE 2

| | Composition | | | Molecular weight | | Physical properties | | | Diblock copolymer content (wt %) |
|---|---|---|---|---|---|---|---|---|---|
| | Ethylene (wt %) | Branch (wt %) | Styrene (wt %) | Mw (g/mol) | PDI | Elongation (%) | Tensile strength (MPa) | Modulus at 300% strain (MPa) | |
| Example 1 | 51.5 | 20.1 | 28.4 | 102,700 | 1.7 | 1,201 | 26.4 | 6.7 | 14.8 |
| Example 2 | 55.1 | 22.0 | 22.9 | 82,000 | 1.6 | 1,301 | 22.4 | 5.5 | 13.2 |
| Example 3 | 49.0 | 21.3 | 29.7 | 98,500 | 1.5 | 1,253 | 25.4 | 5.9 | 11.8 |
| Example 4 | 47.7 | 25.8 | 26.5 | 76,700 | 1.6 | 1,603 | 23.4 | 3.3 | 13.8 |
| Example 5 | 50.8 | 20.7 | 28.5 | 77,900 | 1.6 | 1,356 | 30.6 | 6.2 | 11.5 |
| Example 6 | 48.3 | 27.7 | 24 | 78,400 | 1.7 | 1,845 | 24.1 | 3.5 | 9.6 |
| Example 7 | 49.1 | 20.9 | 30.1 | 101,200 | 1.7 | 1,139 | 29.3 | 6.1 | 11.8 |
| Example 8 | 46.9 | 28.7 | 24.4 | 79,700 | 1.7 | 1,779 | 23.0 | 3.3 | 13.8 |
| Example 9 | 48.4 | 31.6 | 22.0 | 76,100 | 1.9 | 2,208 | 21.2 | 2.4 | 10.2 |
| Comparative Example 1 | 40.7 | 31.9 | 27.4 | 45,000 | 1.1 | 960 | 34 | 1.0 | 0 |
| Comparative Example 2 | 41.3 | 30.8 | 27.8 | 57,000 | 1.1 | 1,030 | 33 | 1.8 | 0 |
| Comparative Example 3 | 48.2 | 39.1 | 12.7 | 65,000 | 1.2 | 1,710 | 18 | 1.5 | 30 |
| Comparative Example 4 | 39.3 | 18.6 | 42.1 | 111,000 | 1.7 | 850 | 9.5 | 4.5 | 21.7 |
| Comparative Example 5 | 45.5 | 22.5 | 32.0 | 109,000 | 1.7 | 1390 | 8.2 | 2.5 | 20.2 |
| Comparative Example 6 | 45.2 | 21.3 | 33.5 | 69,000 | 1.6 | 802 | 16.5 | 7.7 | 19.8 |
| Comparative Example 7 | 47.7 | 16.4 | 35.9 | 68,000 | 1.5 | 1,294 | 21.4 | 5.9 | 20.9 |

Referring to Table 2, it can be seen that the polymer compositions of Examples 1 to 9 exhibited excellent elastic properties in terms of both modulus at 300% strain and elongation at break compared to the SEBSs of Comparative Examples 1 to 3, and it is expected that the polymer compositions of Examples 1 to 9 will exhibit excellent processability because the polymer compositions had relatively high polydispersity index (PDI) values. In addition, it can be seen that the polymer compositions of Examples 1 to 9 had high polydispersity index (PDI) value, exhibited elongation, and also exhibited excellent elastic properties in terms of both modulus at 300% strain and elongation at break, indicating that the polymer compositions of Examples 1 to 9 had excellent physical properties, which were distinguished from those of the polymer compositions of Comparative Examples 4 to 7 having unsatisfactory physical properties in terms of one or more categories.

The invention claimed is:

1. A block copolymer composition, comprising:
a diblock copolymer; and
a triblock copolymer,
wherein the diblock and triblock copolymers each include a polyolefin-based block and a polystyrene-based block,
wherein a content of the diblock copolymer is less than or equal to 19% by weight, based on the total weight of the composition,
wherein the block copolymer composition has a polydispersity index (PDI) of greater than 1.1 to 1.9,
wherein the block copolymer composition has a tensile strength of 10 MPa to 30.6 MPa, as measured according to ASTM D638, and
wherein the polyolefin-based block has a repeating unit represented by the following Formula 1, and the polystyrene-based block includes one or more selected from the group consisting of the following Formulas 2 and 3:

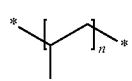

[Formula 1]

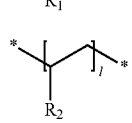

[Formula 2]

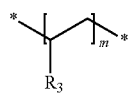

[Formula 3]

wherein $R_1$ is hydrogen, an alkyl having 3 to 20 carbon atoms, or an alkyl having 3 to 20 carbon atoms, which is substituted with silyl, $R_2$ and $R_3$ are each independently an aryl having 6 to 20 carbon atoms, or an aryl having 6 to 20 carbon atoms, which is substituted with a halogen, an alkyl having 1 to 12 carbon atoms, or a cycloalkyl having 3 to 12 carbon atoms, n is an integer ranging from 1 to 10,000, and l and m are each independently an integer ranging from 10 to 1,000.

2. The block copolymer composition of claim 1, wherein $R_2$ and $R_3$ are each independently phenyl, or phenyl unsubstituted or substituted with a halogen, an alkyl having 1 to 8 carbon atoms, ora cycloalkyl having 3 to 12 carbon atoms.

3. The block copolymer composition of claim 1, wherein $R_1$ is hydrogen, or an alkyl having 3 to 12 carbon atoms.

4. The block copolymer composition of claim 1, wherein $R_1$ is hydrogen, or an alkyl having 4 to 12 carbon atoms, and $R_2$ and $R_3$ are phenyl.

5. The block copolymer composition of claim 1, wherein the polyolefin-based block comprises a repeating unit represented by the following Formula 4:

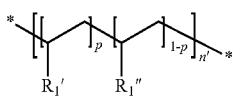

[Formula 4]

wherein $R_1'$ and $R_1''$ are each independently hydrogen, an alkyl having 1 to 20 carbon atoms, an alkyl having 1 to 20 carbon atoms, which is substituted with silyl, an arylalkyl having 7 to 20 carbon atoms, or an arylalkyl having 7 to 20 carbon atoms, which is substituted with silyl, provided that $R_1'$ and $R_1''$ are different from each other, $0<p<1$, and n' is an integer ranging from 10 to 10,000.

6. The block copolymer composition of claim 1, wherein the diblock copolymer and the triblock copolymer each independently comprise a composite block represented by the following Formula 5, which is formed by binding of the polyolefin-based block and the polystyrene-based block:

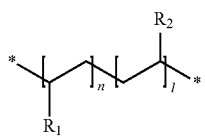

[Formula 5]

wherein $R_1$ is hydrogen, an alkyl having 3 to 20 carbon atoms, or an alkyl having 3 to 20 carbon atoms, which is substituted with silyl, $R_2$ is an aryl having 6 to 20 carbon atoms, or an aryl having 6 to 20 carbon atoms, which is substituted with a halogen, an alkyl having 1 to 12 carbon atoms, or a cycloalkyl having 3 to 12 carbon atoms, l is an integer ranging from 10 to 1,000, and n is an integer ranging from 10 to 10,000.

7. The block copolymer composition of claim 1, wherein the diblock copolymer and the triblock copolymer each independently comprise a composite block represented by the following Formula 6, which is formed by binding of the polyolefin-based block and the polystyrene-based block:

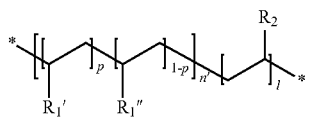

[Formula 6]

wherein $R_1'$ and $R_1''$ are each independently hydrogen an alkyl having 1 to 20 carbon atoms an alkyl having 1 to 20 carbon atoms, which is substituted with silyl, an arylalkyl having 7 to 20 carbon atoms, or an arylalkyl having 7 to 20 carbon atoms, which is substituted with silyl, provided that $R_1'$ and $R_1''$ are different from each other, $R_2$ is an aryl having 6 to 20 carbon atoms, or an aryl having 6 to 20 carbon atoms, which is substituted with a halogen, an alkyl having 1 to 12 carbon atoms, or a cycloalkyl having 3 to 12 carbon atoms.

$0<p<1$, n' is an integer ranging from 10 to 10,000, and l is an integer ranging from 10 to 1,000.

8. The block copolymer composition of claim 1, wherein the triblock copolymer comprises a structure represented by the following Formula 7:

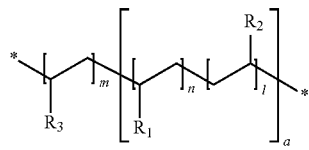

[Formula 7]

wherein $R_1$ is hydrogen, an alkyl having 3 to 20 carbon atoms, or an alkyl having 3 to 20 carbon atoms, which is substituted with silyl, $R_2$ and $R_3$ are each independently an aryl having 6 to 20 carbon atoms, or an aryl having 6 to 20 carbon atoms, which is substituted with a halogen, an alkyl having 1 to 12 carbon atoms, or a cycloalkyl having 3 to 12 carbon atoms, l and m are each independently an integer ranging from 10 to 1,000, n is an integer ranging from 10 to 10,000, and a is an integer ranging from 1 to 50.

9. The block copolymer composition of claim 1, wherein the triblock copolymer comprises a structure represented by the following Formula 8:

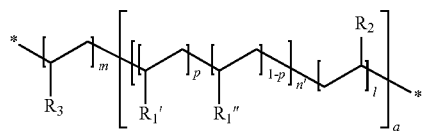

[Formula 8]

wherein $R_1'$ and $R_1''$ are each independently hydrogen, an alkyl having 1 to 20 carbon atoms, an alkyl having 1 to 20 carbon atoms, which is substituted with silyl, an arylalkyl having 7 to 20 carbon atoms, or an arylalkyl having 7 to 20 carbon atoms, which is substituted with silyl, provided that $R_1'$ and $R_1''$ are different from each other, $0<p<1$, $R_2$ and $R_3$ are each independently an aryl having 6 to 20 carbon atoms, or an aryl having 6 to 20 carbon atoms, which is substituted with a halogen, an alkyl having 1 to 12 carbon atoms, or a cycloalkyl having 3 to 12 carbon atoms l and m are each independently an integer ranging from 10 to 1,000, n' is an integer ranging from 10 to 10,000, and a is an integer ranging from 1 to 50.

10. The block copolymer composition of claim 1, wherein the block copolymer composition comprises 10% by weight to 99% by weight of the polyolefin-based block, and comprises 20% by weight to 40% by weight of the polystyrene-based block.

11. The block copolymer composition of claim 1, wherein the block copolymer composition has a weight average molecular weight of 58,000 g/mol to 500,000 g/mol.

12. The block copolymer composition of claim 1, wherein the block copolymer composition has a tensile strength of 21.2 MPa to 30.6 , as measured according to ASTM D638.

13. The block copolymer composition of claim 1, wherein the block copolymer composition has a modulus at 300% strain of 2 MPa to 15 MPa.

14. The block copolymer composition of claim 1, wherein the block copolymer composition has an elongation at break of 800% to 2,000%.

\* \* \* \* \*